3,006,907
PROCESS FOR FINISHING POLYOLEFINES
Karl Rehn, Hofheim (Taunus), and Ernst Junghanns, Siegfried Sommer, and Herbert Bestian, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 17, 1956, Ser. No. 578,587
Claims priority, application Germany Apr. 20, 1955
9 Claims. (Cl. 260—94.9)

This invention relates to a process for finishing polyolefines.

In U.S. patent application Serial Number 575,712 filed April 3, 1956 is described a process for finishing low pressure olefines, preferably polyethylene obtained as described in Belgian Patent 533,362 which corresponds to German patent applications Z 3799, Z 3862, and Z 3882 IVc/39c; in Belgian Patent 534,792, which corresponds to German patent application Z 3941 IVc/39c; in Belgian Patent 534,888 which corresponds to German patent application Z 3942 IVc/39c; and in U.S. patent applications 469,059, filed November 15, 1954, 482,412 filed January 17, 1955, and 482,413, filed January 17, 1955, the latter now abandoned, which comprises treating the polymerization suspension or the polymer which has been separated from the dispersing agent with an aqueous or alcoholic solution of organic or inorganic substances having an alkaline reaction.

The catalysts described in Belgian Patent 533,362 referred to above are prepared by mixing an aluminumtrialkyl with reducible salts of metals of subgroups IV—VI of the periodic table. Among the specific catalyst compositions illustrated in the examples of this patent are aluminumtripropyl-$TiCl_4$, aluminumtriethyl-$TiCl_4$, aluminumtriethyl-zirconium acetylacetonate, aluminumtriethyl-thorium acetylacetonate, aluminumtriethyl-$UCl_4$, aluminumtriethyl-chromium acetylacetonate, aluminumtriethyl-$WCl_6$, aluminumtriisobutyl-zirconium tetrabutylate, etc.

Belgian Patent 534,792 referred to above discloses polymerizing ethylene with catalysts prepared by mixing aluminum compositions of the general formula $R_2AlX$ where R is hydrogen or hydrocarbon and X is hydrogen, halogen, aryloxy, etc., with compositions of metals of subgroups IV—VI of the periodic system, including thorium and uranium. Among the catalysts specifically illustrated in the working examples are aluminumdiethyl chloride-$TiCl_4$, $TiCl_4$-aluminumdiethyl phenolate, $ZrCl_4$-aluminumdiethyl-aminodiethyl, aluminumdiethyl monobromide-anhydric ferro III chloride, aluminumdiethyl monochloride-anhydric ferro II chloride, aluminumdiisobutyl chloride-anhydric nickel II chloride, etc.

Now we have found that the polymers, especially polyethylene, prepared according to the low-pressure processes described in the above patents and patent applications, can be worked up by treating the polymers or polymer suspensions first with an alkaline medium and then by way of a water vapor distillation, thus hydrolizing the accompanying substances of the polymer.

By the process of this invention it is possible completely to prevent corrosions in apparatus during the processing and finishing of the polymers. The process of this invention, furthermore, enables practically a complete recovery of the dispersants used which can be reused without further treatment after separation from water and subsequent drying. Exemplary of these dispersants are hexane, heptane, octane, cyclohexane, toluene and aliphatic hydrocarbons of a boiling range of 100° C. to 250° C., as they are obtained in the distillation of petroleum. As compared with the process described in the above U.S. patent application, which comprises stirring with dilute aqueous alkali at a moderate temperature, the process of this invention involves further unexpected advantages in that an odious odor, occurring during the working up on the injection molding machine, is extensively avoided and in that the final products obtained are still more improved as regards colorlessness and clearness.

This could not be foreseen because of the experiences made in the finishing of polymers in an acid medium, since the products easily undergo discoloration when being processed in an acid medium at an elevated temperature.

According to the process of this invention it is expedient not to subject the whole polymerization suspension to a water vapor distillation, but it is advantageous to separate the major proportion of the dispersing agent, for example 30 to 90 percent, by filtration or centrifugation and, prior to this operation, to destroy the major proportion of the catalyst by agitation with dilute aqueous alkali at room temperature or at an elevated temperature up to about 80° C. to 100° C.

The polymer thus separated is then suspended in water (proportion of polymer: water=1:10 to 1:1) and vapor is passed through the suspension until distilling over of the dispersant ceases. In this case, alkali is added, preferably sodium hydroxide, in an amount such that, in spite of the progressive hydrolysis, the pH value of 7 is maintained. It is advisable not to use an excess of alkali—pH value higher than 9—since in this case the water vapor distillation is accompanied by strong foaming. In order to achieve better mixing, the suspension is stirred and a small quantity of an emulsifier, such as alkyl sulfonates or other known emulsifiers, is added. In this case, the alkyl groups may contain 6 to 20 carbon atoms.

After the distillation, the polymer is separated, washed free from salts, alkali and dispersant, and dried.

The dispersant distilled over is condensed with steam and then separated. After drying, it may be reused in the polymerization process. The losses of dispersing agents in polymerization processes can, in this manner, easily be reduced to below 1 percent. It is obvious that the above process can also be performed continuously and without difficulty in suitable apparatus. The following examples serve to illustrate the invention, but they are not intended to limit it thereto.

*Example 1*

100 grams of a low-pressure polyethylene polymerized in a petroleum fraction (dispersant) boiling between 200 and 230° C. which, after stirring the polymerization batch, has been centrifuged with dilute alkali and which contains 62 percent of dry substance, 27 percent of dispersing agent and 11 percent of water, are blown with water vapor, while stirring well, through a 2 liter flask containing 300 ml. of water and 1 ml. of a 2 percent solution of a fatty acid taurine sulfonate. The pH value is kept between 7 and 9 by adding dropwise a one percent sodium hydroxide solution; the total quantity required is about 25 ml. For the distillation of 27 grams of dispersing agent, about 300 grams of steam are required within about 50 minutes.

After steam distillation, the polymer is centrifuged with suction, washed 3 times, in each case with 300 ml. of water, and dried.

The dispersing agent is separated from the aqueous condensate, dried with KOH and can then be reused.

*Example 2*

100 kg. of a polyethylene obtained as described in Example 1, which contains 65 percent of dry substance, 22 percent of dispersing agent and 13 percent of water, are blown with water vapor, while stirring, through an apparatus containing 500 liters of water and 0.15 liter of a polyoxethylated alkyl phenol. The total amount of dispersing agent is distilled over within about 2 hours using about 200 kg. of steam. To adjust the pH value to 7 to 8 about 1 liter of a 10 percent sodium hydroxide solution is required.

The resulting product is then finished as described in Example 1.

We claim:

1. The process of finishing polyolefins which have been produced by low-pressure polymerization of a lower olefin in the presence of a catalytic amount of a catalyst comprising an organometallic compound and a compound of a metal of sub-groups IV—VI of the periodic table, which comprises the steps of treating a suspension of the polyolefin with an aqueous alkaline material to kill the catalyst, separating the major portion of the suspension medium from the polyolefin, suspending the separated polyolefin in water, and then subjecting the aqueous polyolefin suspension to water-vapor distillation while maintaining the pH of the suspension within the range from about 7 to about 9.

2. The process of claim 1 wherein the water-vapor distillation is performed in the presence of organic substances having an alkaline reaction.

3. The process of claim 1 wherein the water-vapor distillation is performed in the presence of inorganic substances having an alkaline reaction.

4. The process of claim 1 wherein the water-vapor distillation is performed with the aid of a dispersing agent.

5. The process of claim 1 wherein the water-vapor distillation is performed with the aid of an emulsifying agent.

6. The process of claim 1 wherein the water-vapor distillation is performed continuously.

7. In a process for the preparation of polyethylene by the low pressure polymerization of ethylene in the presence of a catalyst comprising a metal-alkyl compound and a compound of a metal of groups IV—VI of the periodic table to form a dispersion of polyethylene in the reaction medium, the improved method of recovering the polyethylene in pure form from the reaction dispersion which comprises adding aqueous alkali to said dispersion to kill the catalyst, separating the major portion of the dispersant from the polyethylene, suspending the separated polymer in water, and subjecting the resulting aqueous suspension of polyethylene to steam distillation at a pH value in the range between 7 and 9 until the residual organic dispersant is distilled off, whereby residual catalyst is hydrolyzed, after which the polyethylene is separated from the suspension, washed, and dried, the final product being substantially odorless, colorless, and clear.

8. Process of claim 7 wherein sufficient alkali is maintained in the aqueous polyethylene suspension during steam distillation to maintain a pH in the range between 7 and 9.

9. Process of claim 7 wherein the aqueous polyethylene suspension is stirred and an emulsifier is added during the steam distillation.

References Cited in the file of this patent

UNITED STATES PATENTS

| | | |
|---|---|---|
| 2,023,495 | Thomas | Dec. 10, 1935 |
| 2,062,845 | Thomas et al. | Dec. 1, 1936 |
| 2,290,794 | Alvarado | July 21, 1942 |
| 2,394,960 | Young | Feb. 12, 1946 |
| 2,606,179 | Boyd | Aug. 5, 1952 |
| 2,838,477 | Roelen et al. | June 10, 1958 |
| 2,905,645 | Anderson | Sept. 22, 1959 |

FOREIGN PATENTS

| | | |
|---|---|---|
| 473,116 | Canada | 1951 |
| 533,362 | Belgium | May 16, 1955 |